(12) United States Patent
Ohkawa

(10) Patent No.: US 7,431,492 B2
(45) Date of Patent: Oct. 7, 2008

(54) LIGHT CONTROL MEMBER, SURFACE LIGHT SOURCE DEVICE AND DISPLAY

(75) Inventor: Shingo Ohkawa, Misato (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 11/360,387

(22) Filed: Feb. 24, 2006

(65) Prior Publication Data
US 2006/0203494 A1  Sep. 14, 2006

(30) Foreign Application Priority Data
Feb. 25, 2005 (JP) .............................. 2005-051886

(51) Int. Cl.
*F21V 7/04* (2006.01)
(52) U.S. Cl. ................. 362/621; 362/626; 362/628
(58) Field of Classification Search ............. 362/600, 362/612–613, 615–617, 625–626, 620–621, 362/628, 339–340, 623, 331, 333, 335–336; 349/64; 385/129, 901
See application file for complete search history.

(56) References Cited

U.S. PATENT DOCUMENTS

| | | | | |
|---|---|---|---|---|
| 5,043,856 A | * | 8/1991 | Levin | 362/309 |
| 5,552,907 A | * | 9/1996 | Yokota et al. | 349/62 |
| 5,572,411 A | * | 11/1996 | Watai et al. | 362/620 |
| 6,049,649 A | * | 4/2000 | Arai | 385/133 |
| 7,142,768 B2 | * | 11/2006 | Tseng | 385/146 |
| 2003/0058655 A1 | * | 3/2003 | Chuang | 362/521 |
| 2004/0085771 A1 | * | 5/2004 | Klose | 362/307 |
| 2006/0050533 A1 | * | 3/2006 | Yang et al. | 362/613 |
| 2006/0087866 A1 | * | 4/2006 | Ng et al. | 362/612 |

FOREIGN PATENT DOCUMENTS

| | | |
|---|---|---|
| JP | 3-200930 | 9/1991 |
| JP | 6-265888 | 9/1994 |

* cited by examiner

*Primary Examiner*—Jong-Suk (James) Lee
*Assistant Examiner*—Julie A. Shallenberger
(74) *Attorney, Agent, or Firm*—Staas & Halsey LLP

(57) ABSTRACT

Primary light from primary light source (LED) is supplied toward a light an input face of an light control member. The light input face is provided with a plurality of projections for light input promotion. Each projection is composed of a generally spherical top portion and tapered column-like portion. Height of each projection may greater than a distance as far as an adjacent projection. An light output face of the light control member may be provided with of a plurality of projections having a function of causing an inner incident light to be deflected as to approach a frontal direction on being emitted, or may be formed of a roughened surface. A light flux control member may be interposed between the primary light source and the light control member.

21 Claims, 20 Drawing Sheets

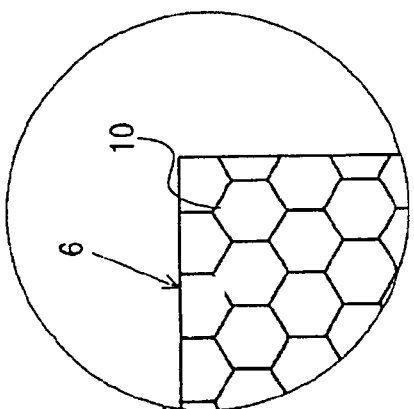
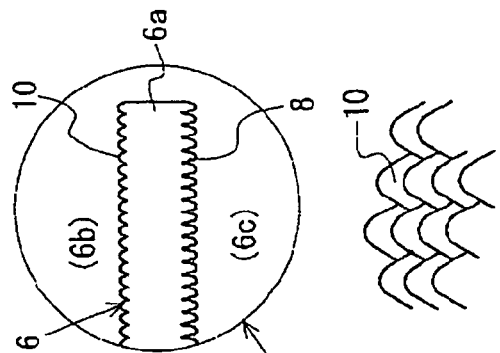
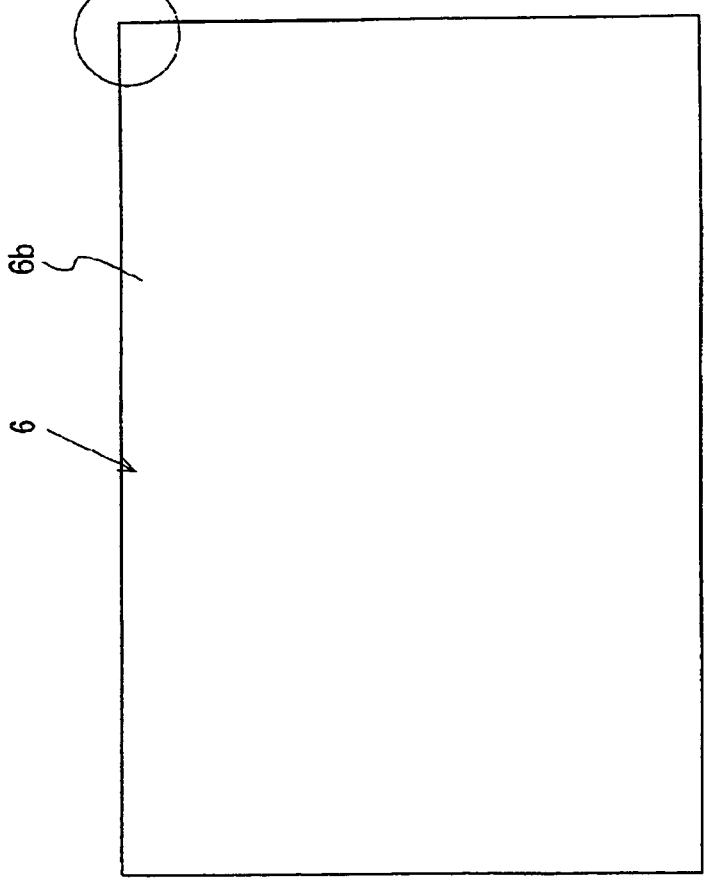
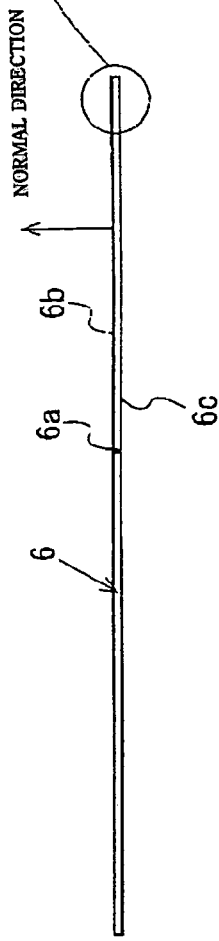
Fig.3c
Fig.3d
Fig.3e
Fig.3a
Fig.3b

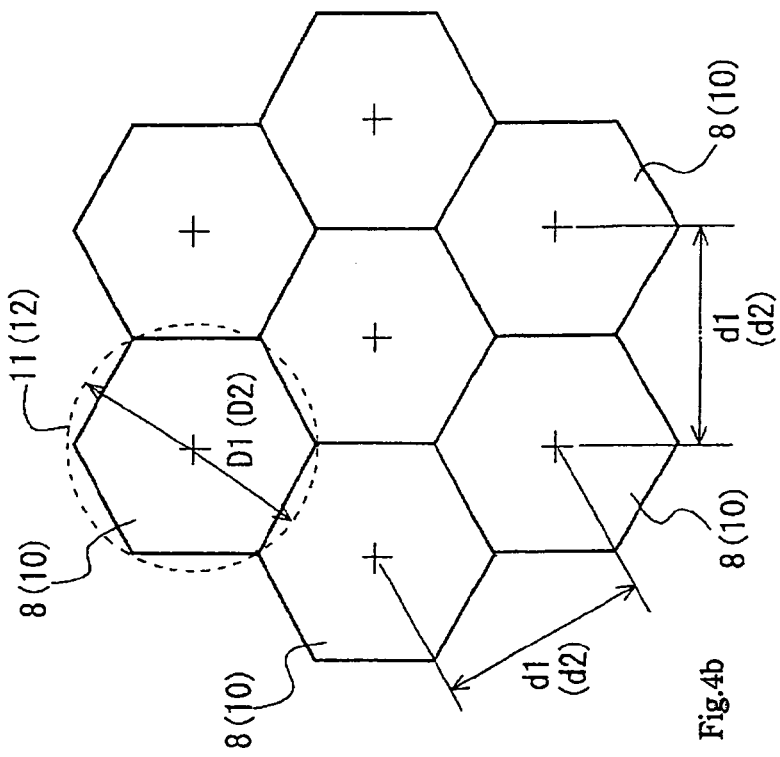
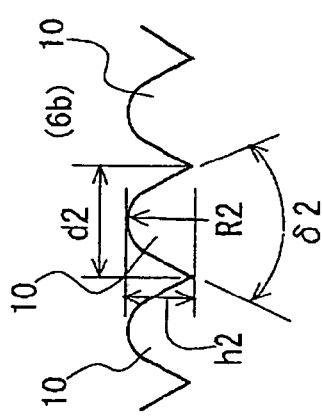
Fig.4c
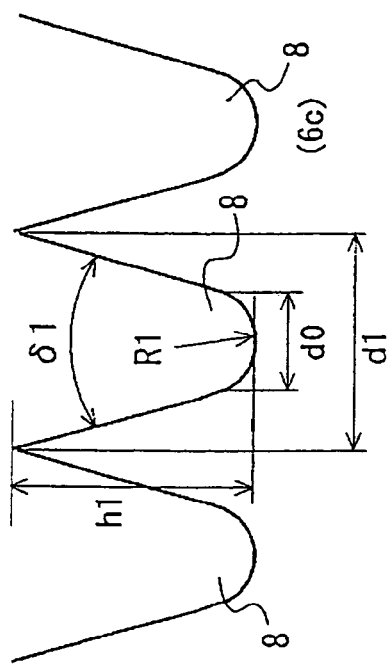
Fig.4a

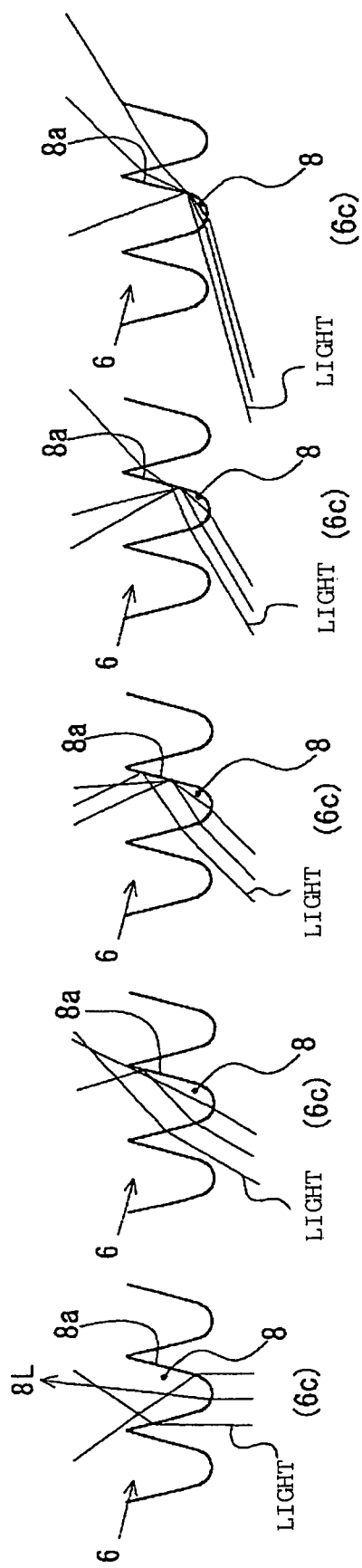

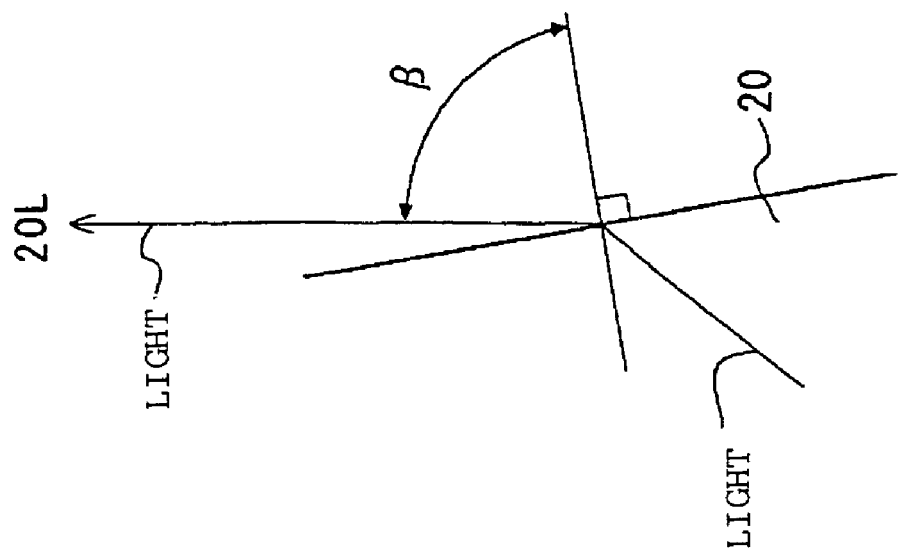
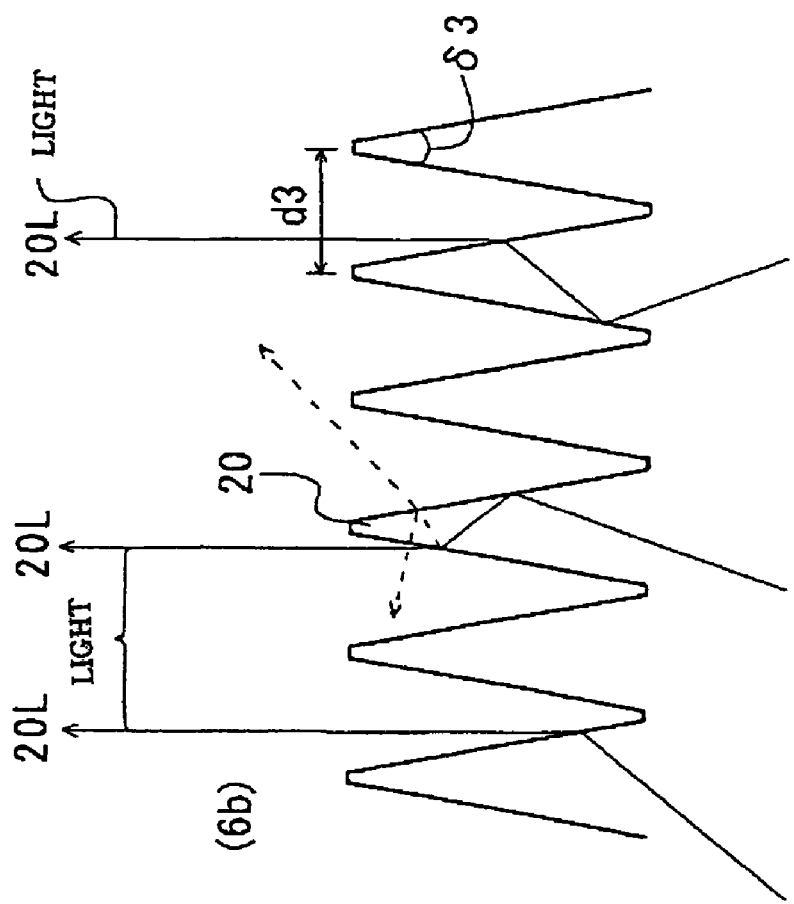
Fig.8a
Fig.8b

LIGHT CONTROL MEMBER, SURFACE LIGHT SOURCE DEVICE AND DISPLAY

BACKGROUND

1. Field of Invention

The present invention relates to a light control member provided with a light input face for introducing light from a light source and a light output face for emitting the light, and to a surface light source device employing the light control member and to a display (such as LCD) provided with a displaying member (such as LCD panel) backlighted by the surface light source device.

2. Related Art

A LCD display a LCD of which is backlighted by a surface light source device is known well, being broadly applied to monitor displays for personal computers, television sets and others.

In general, a surface light source device has a light source called "primary light source". A known type of surface light source device for backlighting applied to such uses is called "directly-under-type surface light source device".

A directly-under-type surface light source device has a primary light source which is disposed behind (directly under) a displaying member (such as LCD panel). Accordingly, it is required to prevent the primary light source looks conspicuous through the displaying member. In other words, an image of the primary light source must to be blurred. For this purpose, employed is an optical member diverging travelling directions of the light emitted from the primary light source, typically a diffusing member having a high light diffusing ability.

However, an excessive high light diffusing ability brings backlight by light like a rather completely diffused light, resulting in a reduced frontal brightness. Then it is needless to say that a weak light diffusing ability fails to blur the image of primary light source, resulting in a reduced display quality.

FIG. 20 illustrates an example of prior art (first prior art) for relaxing such a problem, which is disclosed in Document 1 noted below. Referring to FIG. 20, surface light source device 100 has light source (primary light source) 101, reflection member 102, diffusion sheet 103 and polygon-pyramids-sheet 104.

Light of light source (primary light source) 101 is inputted to polygon-pyramids-sheet 104 via diffusion sheet 103 after or without being reflected by reflection member 102, then being outputted from an opposite face (light output face) of the polygon-pyramids-sheet. Travelling directions of light are diverged by diffusion sheet 103 and gathered around a frontal direction (normal direction). As a result, a relaxed falling of brightness as viewed from the frontal direction is obtained.

FIG. 21 illustrates another example of prior art (second prior art), which is disclosed in Document 2 noted below. Referring to FIG. 21, surface light source device 110 has light source (primary light source) 111, reflection member 112, multiprism-sheet 113 and dark-area-removing-sheet 114.

Light of light source (primary light source) 111 is outputted as an illumination light via multiprism-sheet 113 and dark-area-removing-sheet 114. The outputted illumination light irradiates, for instance, a LCD panel.

Document 1; Tokkai-Hei 6-265888
Document 2; Tokkai-Hei 3-200930

However, the first embodiment is subject to a fact that light from light source 101 include a light component which is incident to a lower face of polygon-pyramids-sheet 104 and totally-reflected by pyramid slope 105 as to be returned to the inside of housing 106 (i.e. to the side of light source 101). Such returning light is reflected by reflection member 102 and incident to diffusion sheet 103 again, involving an attenuation of light (energy loss) due to repeated reflections between reflections member 102 and polygon-pyramids-sheet 104. Needless to say, this energy loss is not desirable.

According to the second prior art, much of the light obliquely incident to multiprism sheet 113 is emitted to a certain direction intensively from incident to multiprism sheet 113, then being deflected around the frontal direction by dark-area-removing sheet 114.

However, there are remarkable light components which are reflected by multiprism sheet 113, much of such reflected light being subject to repeated reflections between reflections member 112 and multiprism sheet 113. As a result, a remarkable energy loss is generated generally IN the same way as the first prior art.

In addition, the first prior art employs a combination of plural kinds of members including diffusion sheet 103 and polygon-pyramids-sheet 104. Similarly, the second prior art employs a combination of plural kinds of members including multiprism sheet 113 and dark-area-removing-sheet 114.

Therefore an increased numbers and kinds of members must be prepared, bringing much light loss at interfaces between the respective members and the exterior (air). Accordingly, it is difficult to satisfy demands for simplifying structure and reduction in number of part items.

OBJECT AND SUMMARY OF INVENTION

An object of the present invention is to provide a light control member which is superior in inputting efficiency and gives a small energy loss. Another object of the present invention is to provide a surface light source device which has a high light utilizing efficiency and can avoids part items from increasing by employing the light control member. Still another object of the present invention is to provide a display which can provides a bright displaying easily by employing the surface light source device.

First, the present invention provides a light control member comprising a light input face and a light output face opposite with said light input face.

According to a basic feature of the present invention, said light input face is provided with a plurality of projections for light input promotion, each of which is composed of a generally spherical top portion and a tapered column-like portion.

Each of said projections preferably has a height greater than a distance as far as an adjacent projection. Said light output face may be formed of a roughened surface, or may be provided with a plurality of projections for light output direction control.

The present invention is also applied to a surface light source device comprising a light control member provided with a light input face, a light output face opposite with the light input face and a primary light source supplying primary light toward the light input face.

According to a feature of the present invention, the light control member is one improved as above. A light flux control member may be interposed between said primary light source and said light control member, thereby said primary light being incident to said light input face after transmitting through said light flux control member.

In addition, the present invention is applied to display comprising a surface light source device and a displaying member supplied with light from the surface light source device.

According to a feature of the present invention, the surface light source device is one improved as above.

Since each of a plurality of projections formed on a light input face of light control member according to the present invention is composed of a generally spherical top portion and a tapered column-like portion, realized are not only a high input efficiency but also an efficient diverging of travelling directions. Therefore the light control member outputs a highly bright emission and bright-dark unevenness corresponding to a distribution of projections made inconspicuous.

A surface light source device employing such excellent characteristics can provide a bright and uniform illumination without increasing number of part items. In addition, a display using the surface light source device for illuminating a displaying member can give a bright and high-quality display operation.

BRIEF DESCRIPTION OF DRAWING

FIG. 3a is a plan view of the displaying member;

FIG. 3b is a side view of the displaying member;

FIG. 3c is a partially enlarged illustration of FIG. 3a;

FIG. 3d is a partially enlarged illustration of FIG. 3b;

FIG. 3e is a perspective view of projections on a light output face of the light control member;

FIG. 4a is an enlarged side view of projections on a light input face of the light control member;

FIG. 4b is a frontal view of projections shown in FIG. 4a;

FIG. 4c is an enlarged side view of projections on a light output face of the light control member;

FIGS. 5a to 5e are diagrams for illustrating functions of projections on a light input face of the light control member;

FIG. 7b is a cross section view along X2-X2 in FIG. 7a;

FIG. 8a is an enlarged side view of projections on a light output face of the light control member shown in FIG. 7b;

FIG. 8b is an enlarged partial view of projections shown in FIG. 8a;

FIG. 10a is a side view of a second modification of light control member;

FIG. 10b is a partially enlarged illustration of FIG. 10a;

FIG. 11a is a side view of a third modification of light control member;

FIG. 11b is a side view of the light control member:

FIG. 11c is a partially enlarged illustration of FIG. 11a;

FIG. 11d is a partially enlarged illustration of FIG. 11b;

EMBODIMENT

First Embodiment (Outlined Structure of Surface Light Source Device and Display)

Figure 1:
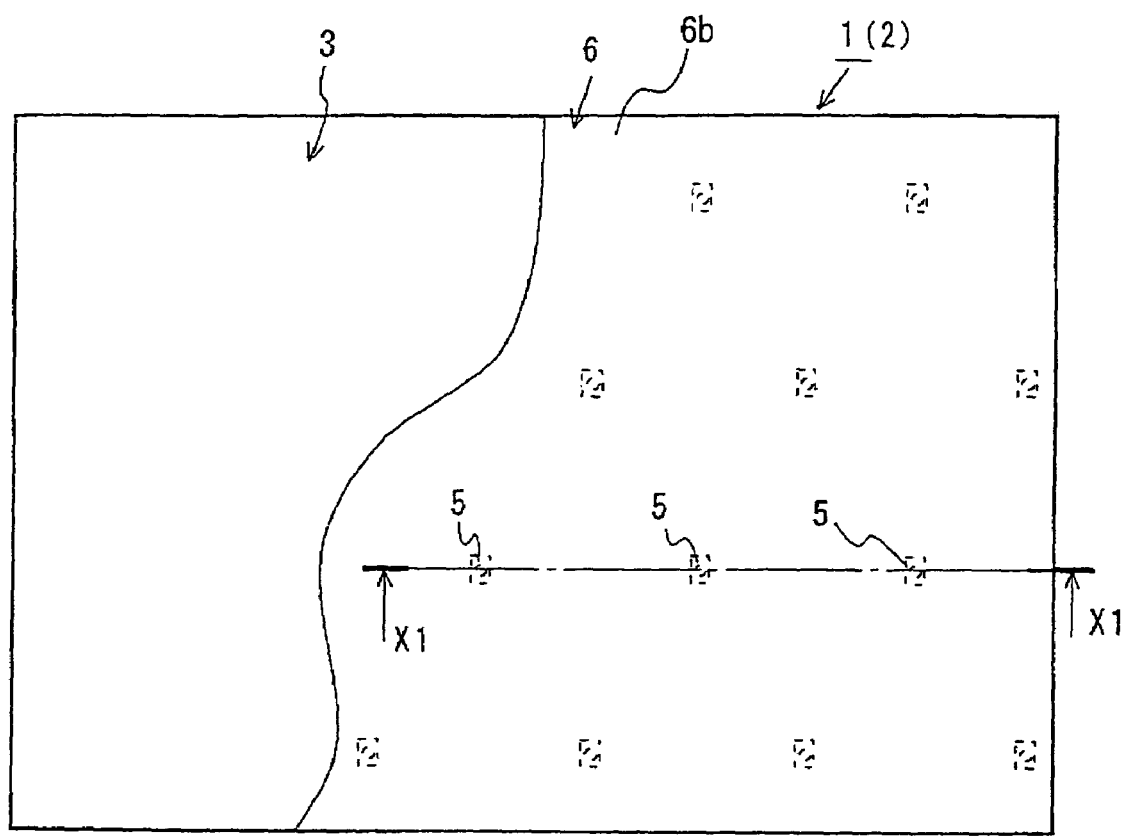
FIG. 1 is a plan view of a surface light source device and a display employing the same to which the present invention is applicable, a part of displaying member being cut off.
Figure 2:
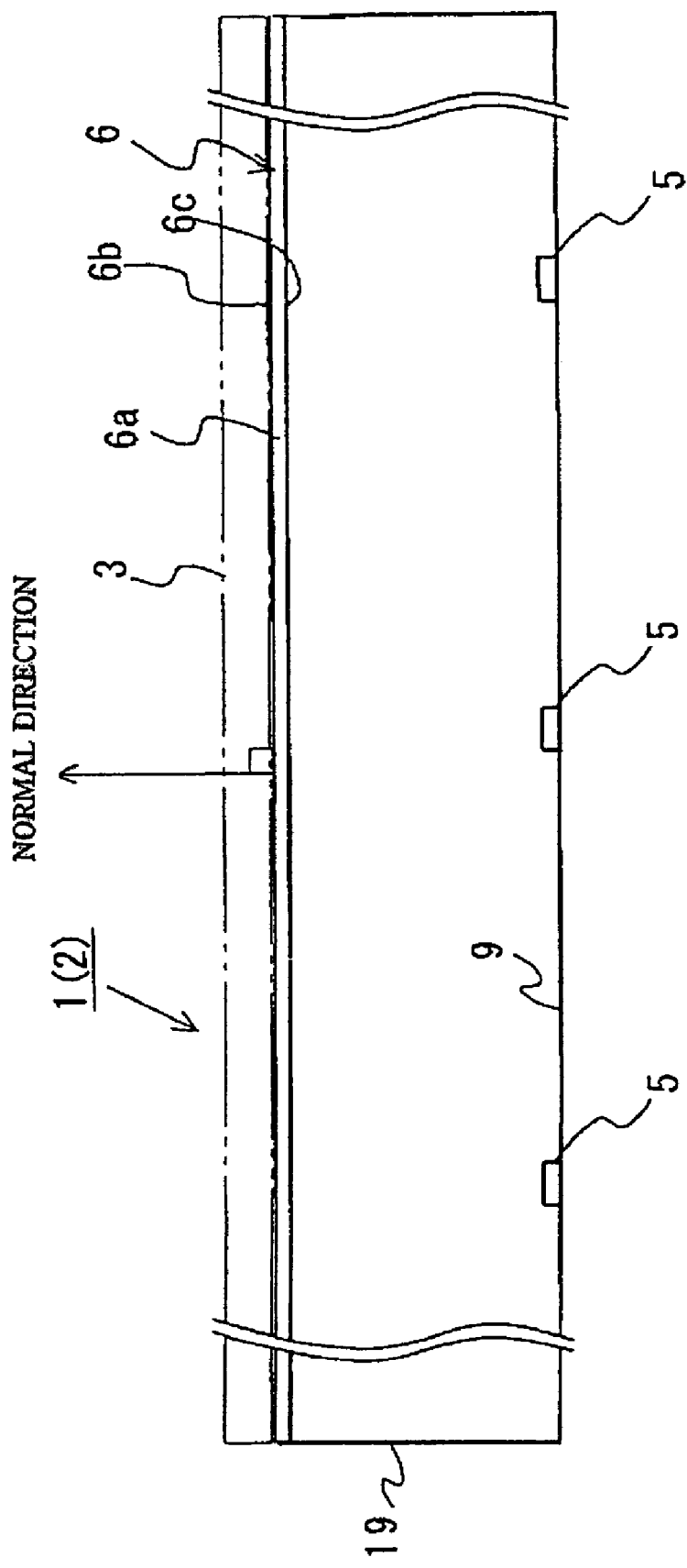
FIG. 2 is a cross section view along X1-X1 in FIG. 1.

FIGS. 1 and 2 illustrate display 1 employed in this embodiment and surface light source device 2 employed in display 1. FIG. 1a is a plan view of a surface light source device and a display employing the same to which the present invention is applicable, a part of displaying member being cut off, and FIG. 2 is a cross section view along X1-X1 in FIG. 1.

Referring to the illustrations, display 1 is composed of displaying member (an example of member-to-be-illuminated) 3 and surface light source device 2 for supplying light for displaying to displaying member 3. Surface light source device 2 comprises light control member 6 disposed on the back side of displaying member 3, a plurality of primary light sources (such as LEDs) 5 disposed on the back side of light control member 6 at intervals and reflection member 9 disposed as to surround LEDs 5.

Reflection member 9 is generally formed of a light-reflective resin sheet such as PET (polyethylene terephthalate) sheet or a reflection sheet made of a resin sheet to which silver-vapour-evaporation is applied. It is noted that reflection member 9 may be omitted, if housing 19 has a well light-reflective inner surface. In general, a member supplied with illumination light is a displaying member such as LCD panel, advertising panel or marker panel.

(Light Control Member)

FIGS. 3a and 3b are a plan view and a side view of the displaying member employed in display 1. FIG. 3c is a partially enlarged illustration of FIG. 3a and FIG. 3d is a partially enlarged illustration of FIG. 3b, and FIG. 3e is a perspective view of projections on a light output face of the light control member.

Referring to the illustrations, light control member 6 is a sheet-like or panel-like member made of a light-permeable material (for example, resin such as PMMA (polymethyl methacrylate) or PC (polycarbonate), having a shape and size generally the same those of displaying member 3.

One of major faces of light control member 6 provides a light output face (opposite to displaying member 3) 6b and the other (opposite major face) of light control member 6 provides a light input face 6c.

FIG. 3a gives an aspect as viewed from the side of light output face 6b. FIG. 3e gives a partial perspective aspect of light output face 6b as viewed obliquely rom above.

A base portion of light control member 6 is denoted by 6a, projecting as to the side of the primary light sources so that many projections 8 are formed on light input face 6*c*. Each projection 8 is composed of a top portion like a hemisphere (a shape given by partially cutting a sphere) and a tapered column-like portion.

On the other hand, many generally conical projections 10 each having a top rounded like a hemisphere on light output face 6*b*. It can be said that base portion 6*a* is given by excluding projections 8 and 10 from light control member 6. Projections 8 and 10 have shapes similar to each other. An example of detailed shape of projection is illustrated in FIGS. 4*a* and 4*b*. Symbols are defined as follows.

$\delta_1$=Apex angle (tapering angle of tapered column-like portion)
$R_1$=Curvature radius of top portion
$h_1$=Height of top portion 8 from base portion 6*a* (top portion height)
$d_0$=Diameter of top portion 8 at a part connecting a conical slope of tapered column-like portion and hemisphere-like top portion
$d_1$=Distance between projections 8, 8 adjacent to each other (arrangement pitch)

The following relation formula is preferably satisfied.

$h_1/d_1 > 1$

FIG. 4*b* illustrates a two-dimensional arrangement of projections 8 and 10, showing one projection 8 (on light input face 6*c*) and one projections 10 (on light output face 6*b*) are located in an area of each regular hexagon. As illustrated, each hexagon provides boundary lines between hexagon adjacent thereto without gap.

For the sake of easy understanding, concretes dimensions of projection 8 are shown as below.

$\delta_1 = 30°$
$R_1 = 0.075$ mm
$h_1 = 0.345$ mm
$d_0 = 0.145$ mm
$d_1 = 0.300$ mm Under the above values, $(h_1/d_1) = 1.15 (>1)$ is satisfied. In FIG. 4*b*, diameter $D_1$ of circumscribed circle 11 of each hexagon is 0.346 mm.

These values of sizes and angles are merely examples, generally allowing to be determined as to give the optimum values depending on required factors such as emission characteristics.

On the other hand, each projection 10 on light output face 6*b* is also composed of hemisphere-like top portion and tapered column-like portion, and symbols are defined as follows.

$\delta_2$=Apex angle (tapering angle of tapered column-like portion) 項
$R_2$=Curvature radius of top portion
$h_2$=Height of top portion 10 from base portion 6*a* (top portion height)
$d_2$=Distance between projections 10, 10 adjacent to each other (arrangement pitch)

It is preferable that $(h_2/d_2) < 1$ is satisfied. Dimension examples of projection 10 is as follows.

$d_2 = 0.120$ mm
$h_2 = 0.074$ mm
$\delta_2 = 60$
$R_2 = 0.030$ mm

Under the above values, $(h_2/d_2) = 0.617 (<1)$ is satisfied. In FIG. 4*b*, diameter $D_2$ of circumscribed circle 12 of each hexagon is 0.139 mm. These values of sizes and angles are merely examples, generally allowing to be determined as to give the optimum values depending on required factors such as emission characteristics.

FIGS. 5*a* to 5*e* are diagrams for illustrating functions of projections 8, showing primary light paths respectively corresponding to five components depending on incidence angle with respect to light input face 6*c*. As illustrated, incidence angle gets greater in order from FIG. 5*a* to FIG. 5*e*.

As understood from such illustrations, hemisphere-like projection and slope 8*a* of tapered column-like portion of projection 8 are effectively utilized depending on incidence angle. That is, projection and slope 8*a* of tapered column-like portion convert light within a broad incidence angle range into inner propagation light directed to light output face 6*b* without fail through refraction or inner-reflection. Besides, the inner propagation light has diverged traveling directions. It is noted that "inner propagation light" is defined as light propagating within light control member 6.

In particular, slope 8*a* of conical-like (a shape example of tapered column-like portion) diverges incident light broadly.

Since light control member 6 allows light input from a broad angular range as above, each projection 8 accepts not only light from LEDs 5 near thereto but also light from far LEDs 5. In other words, many imaginary images of LEDs are generated on one projection, with the result that individual images of LEDs 5 are blurred as a whole and become inconspicuous.

In addition, since top portions are not sharp, light introduction from top portions is easier as compared with cases where top portions are made sharp. In particular, if top portions are sharp, it will be difficult to obtain light component of a direction like 8L shown in FIG. 5*a*, and shades (dark parts) corresponding to top points of top portions will be apt to be observed from the side of light output face 6*b*. This embodiment can avoid such shades (dark parts) from appearing because top portions are hemisphere-like and not sharp.

In addition, a relation $d_1 < h_1$ is advantageous for obtain surface area enough to perform an effective function for light inputting.

Figure 6:
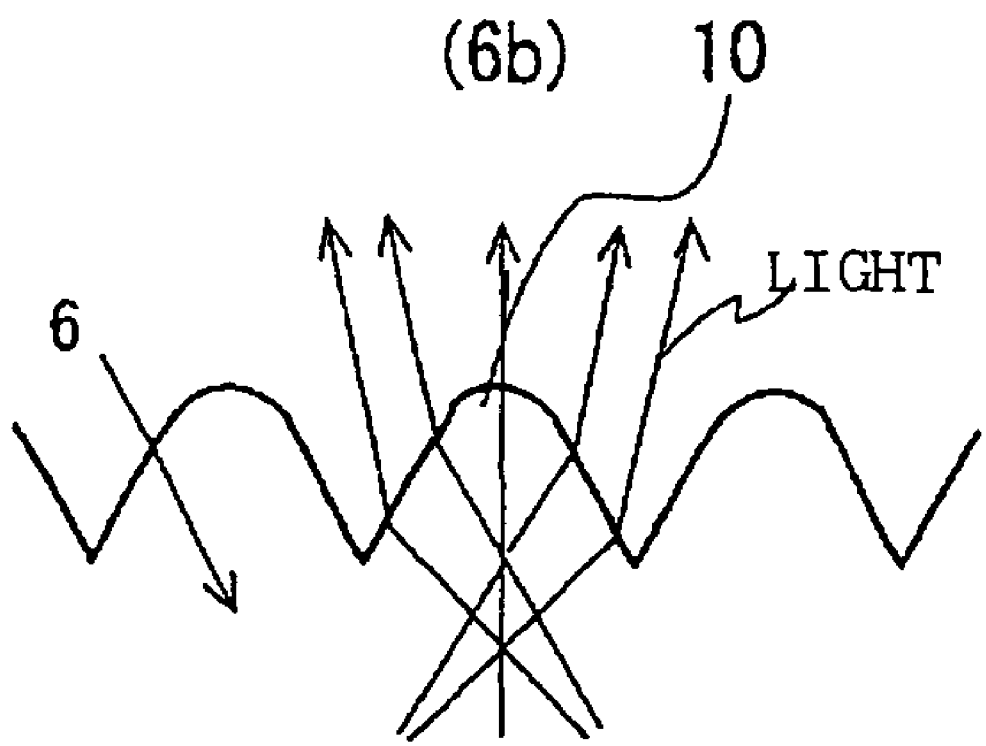
FIG. 6 is a diagram for illustrating functions of projections on a light output face of the light control member.

In the next place, FIG. 6 is a diagram for illustrating functions of projections 10 on light output face 6*b*. As illustrated, projections 10 function as a light gathering means that deflect light travelling directions diverged by projections 8 on light input face 6*c* (See FIG. 5) around a normal direction (frontal direction).

That is, projections 8 of light control member 6 employed in this embodiment produce inner propagation light travelling in broadly diverged directions and then the produced inner propagation light is redirected to the frontal direction. Therefore light output face 6*b* provides not only a uniformalized emission brightness distribution but also an increased emission brightness as viewed from the frontal direction. In other words, surface light source device 2 provide a highly uniform emission brightness and supplies sufficient illumination light toward the frontal direction. As a result, LCD panel (displaying member) 3 is supplied with sufficient illumination light, displaying bright images. In addition, frontal viewing is made easy.

Since this embodiment can provide illumination light of excellent quality by using one piece of light control member 6, this embodiment requires a decreased number of part items, being advantageous for making whole structure compact and reducing product cost.

(First Modification of Light Control Member)

Figure 7A:
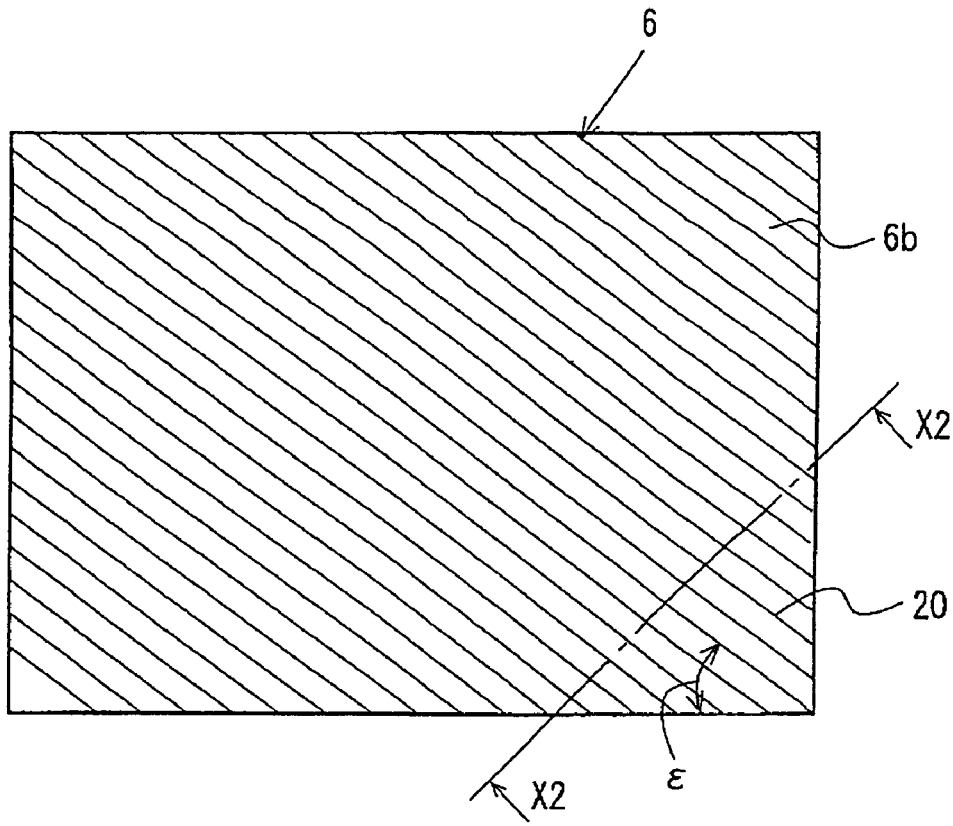
FIG. 7a is a plan view of a first modification of light control member.
Figure 7B:
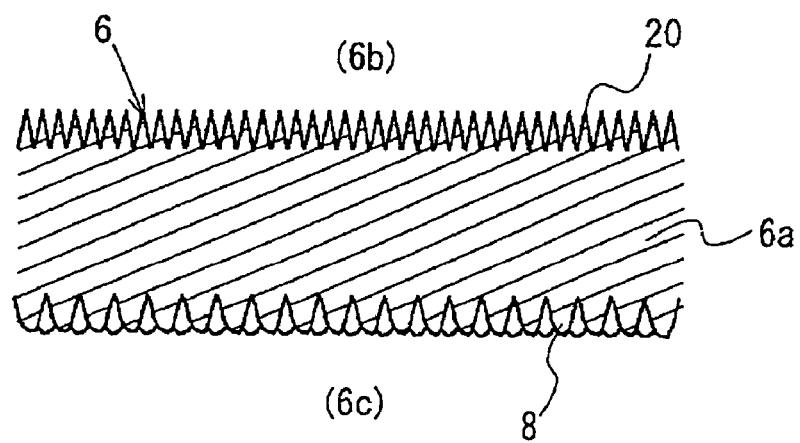

FIG. 7*a* is a plan view of a first modification of light control member and FIG. 7*b* is a cross section view along X2-X2 in FIG. 7*a*. FIG. 8*a* is an enlarged side view of projections on a light output face of the light control member shown in FIG. 7*b* and FIG. 8*b* is an enlarged partial view of projections shown in FIG. 8*a*.

Referring to the illustrations, light output face 6b of light control member 6 is provided with many projections 20 as shown in FIGS. 7b and 8a instead of projections 10 as shown in FIG. 4c. Except for this, employed is structure the same as that of the embodiment already described. Projections 20 shows polarization characteristics by which plenty of P-components are emitted to a frontal direction shown in FIG. 8a (i.e. a direction vertical with respect to a general extending plane of displaying member 3 shown in FIG. 2).

Projections 20 each having a cross section shaped like a triangle (FIG. 8a) are disposed along a direction (for example, $\epsilon=45°$) according with a transmission axis (an extending direction of transmitting-permitting polarization plane) of displaying member (LCD panel) 3 parallelly as shown in FIG. 7s. Arrangement pitch d3 of projections 20 is very small, for example, about 30 μm.

Triangular cross section of top portion 20 has apex angle δ3 which is, for example, equal to 20°. It is noted that top portions and valley bottom portions between top portions 20, 20 adjacent to each other are configurated like a linear or arc cut.

Figure 9:
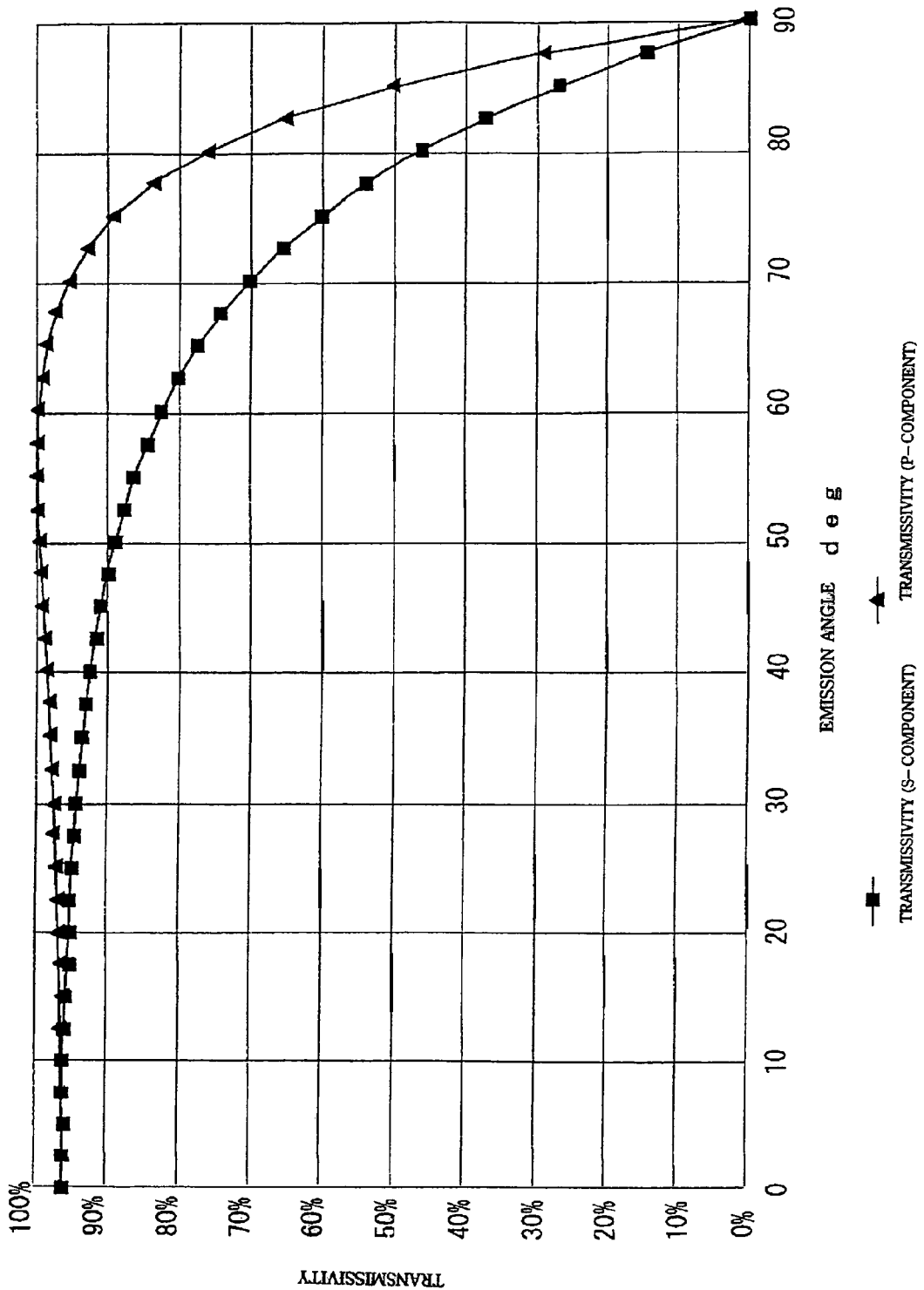
FIG. 9 is a diagram for illustrating functions of projections shown in FIG. 8, showing a relation between emission angles from projections and transmissivity of polarization components.

FIG. 9 gives a graph showing a relation between emission angle β (FIG. 8b) and transmissivity of P-polarization component and S-polarization component for light control member 6. As illustrated in this graph, transmissivity of P-polarization component is high roughly within a range of emission angle β from 70° to 80.

Therefore projections are preferably shaped so that emission angle β within this range accords with an emission direction which should be provided by surface light source device 2 (for example, normal direction or direction of light 20L shown in FIG. 8a).

It is noted that dotted line shown in FIG. 8a gives an emitted light P-polarization component and S-polarization component of which show an equal transmissivity level.

Employing light control member 6 of the first modification, LCD panel 3 is effectively supplied with light contributing to displaying operation. In other words, light from LED 5 is converted effectively into light used for displaying operation.

(Second Modification of Light Control Member)

The above-described embodiment and first modification show cases in which light output face 6b of light control member 6 is provided with projections 10 or 20, putting no limitation on the present invention.

Figure 10:
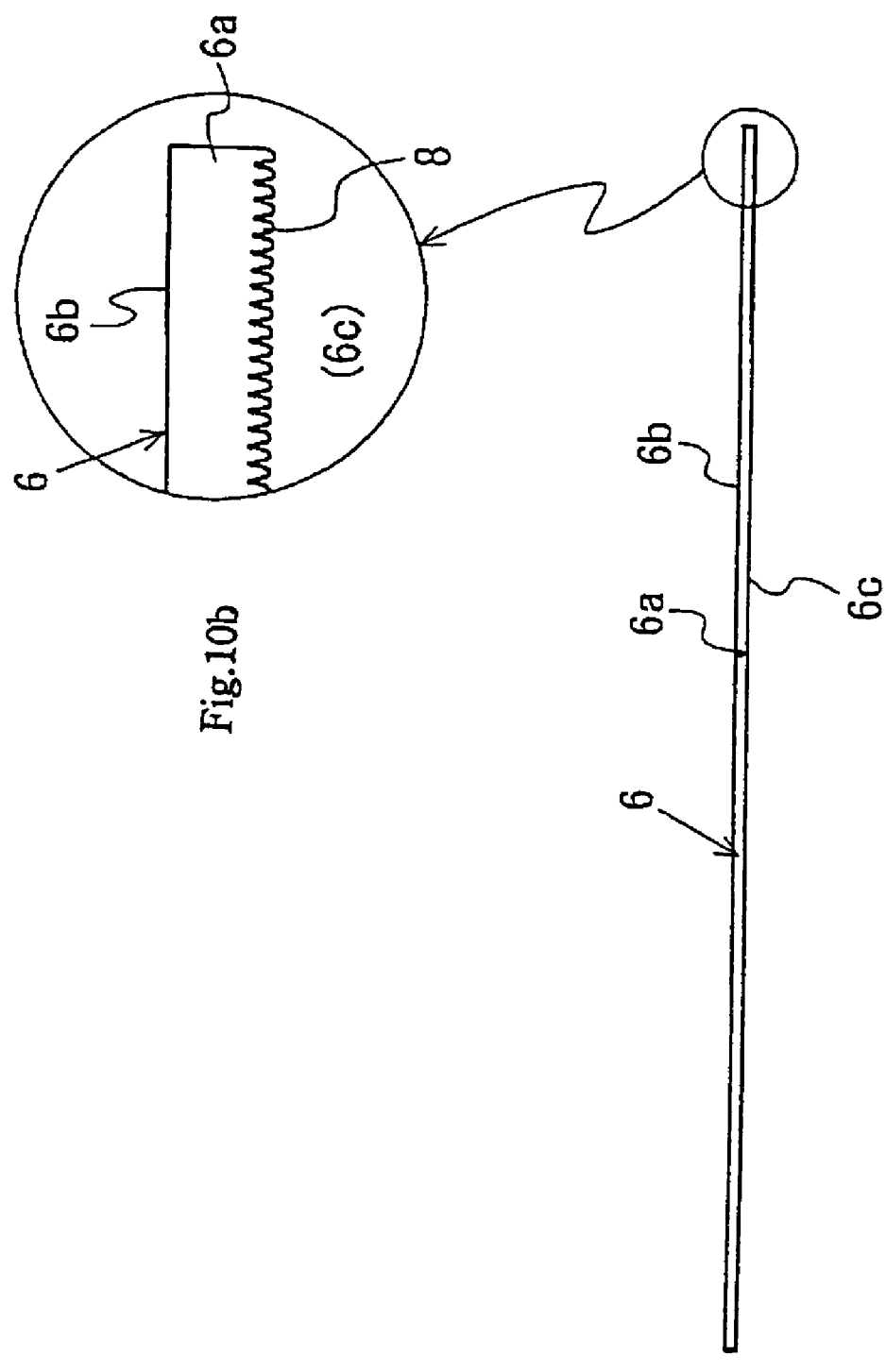

For example, light output face 6b of light control member 6 may a flat face as shown in FIGS. 10a and 10b. If so, projections 8 on light input face 6c of light control member 6 introduce light from LED 5 into light control member 6 with a small loss and output a bright illumination light from light output face 6b by effecting inner-reflection and refraction broadly, too. Therefore a bright illumination light can be outputted from light control member 6 broadly.

(Third Modification of Light Control Member)

Figure 11:
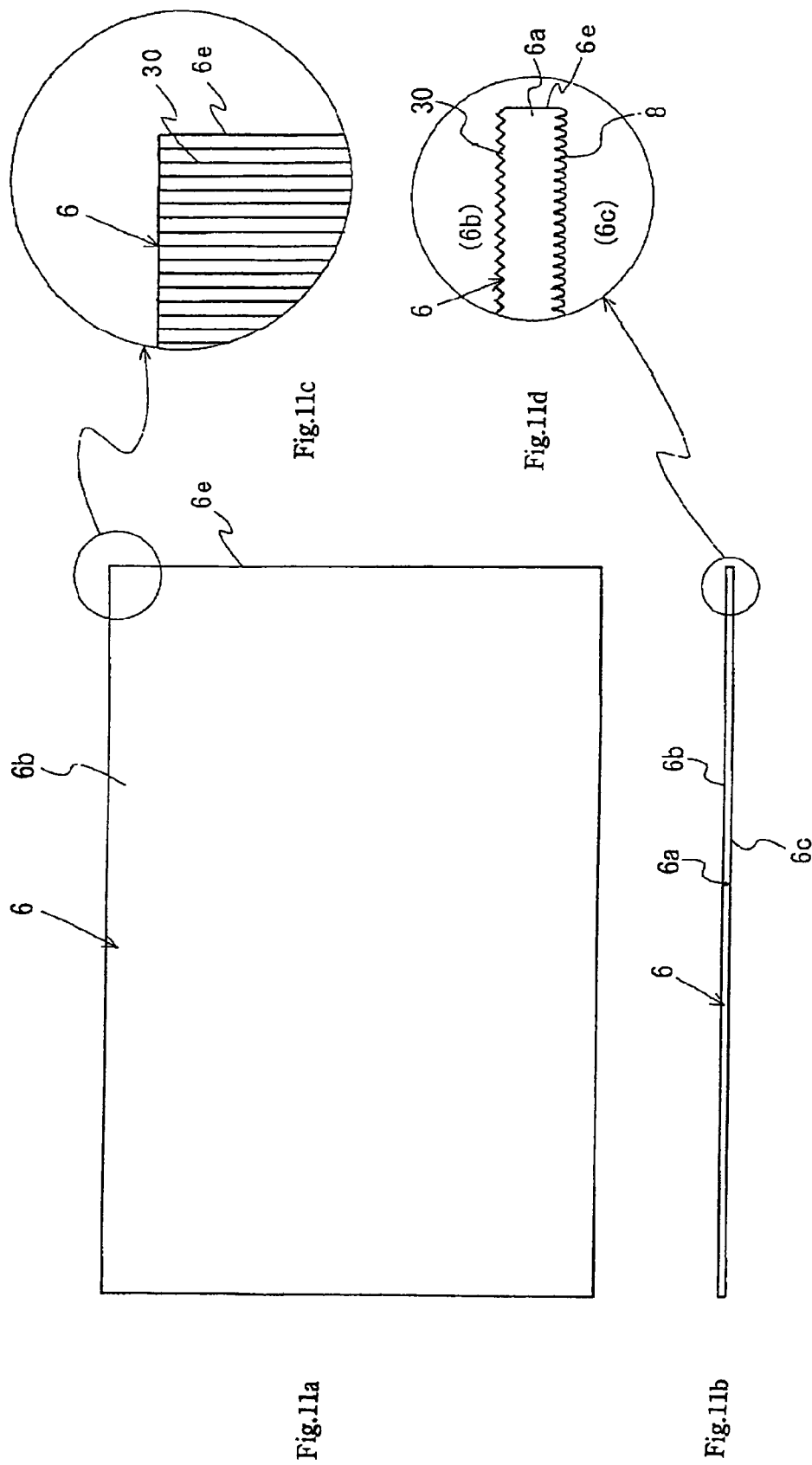

FIG. 11a is a side view of a third modification of light control member and FIG. 11b is a side view of the light control member. FIG. 11c is a partially enlarged illustration of FIG. 11a and FIG. 11d is a partially enlarged illustration of FIG. 11b.

Light output face 6b of light control member 6 of the third modification is provided with many prismatic projections 30 running along side face 6e, each having a triangle-like cross section. Except for this, employed is structure the same as that of the embodiment already described.

Projections 8 on light input face 6c of light control member 6 introduce primary light effectively into light control member 6 and direct to light output face 6b by effecting inner-reflection and refraction broadly.

Prismatic projections 30 cause light to be deflected to a normal direction (frontal direction) on outputting. Therefore a displaying member is sup plied with illumination light effectively.

(Other Modifications of Light Control Member)

Other modifications of light control member 6 may be employed. For example, inner-scattering ability may be given by dispersing diffusing material within base portion 6a. Processing for giving diffusibility such as roughening process like matting or others may be applied instead of forming projections 10 on light output face 6b. For example, fine unevenness as light diffusing means may be employed for outputting diffused light.

A case shown in FIG. 4b in which regular hexagons are formed by profiling lines between projections 8 or 10 adjacent to each other is described, putting no limitation on the present invention. For example, projections 8 or 10 may be arranged so that other shapes such as long or wide hexagons, rectangles may be formed profiling lines between projections 8 or 10 adjacent to each other.

(Other Modifications of Surface Light Source Device and Display)

Surface light source device 2 and display 1 comprising the same of the above-described embodiment employs LEDs 5 as primary light source. However, this does not limit the scope of the present invention.

Figure 12:
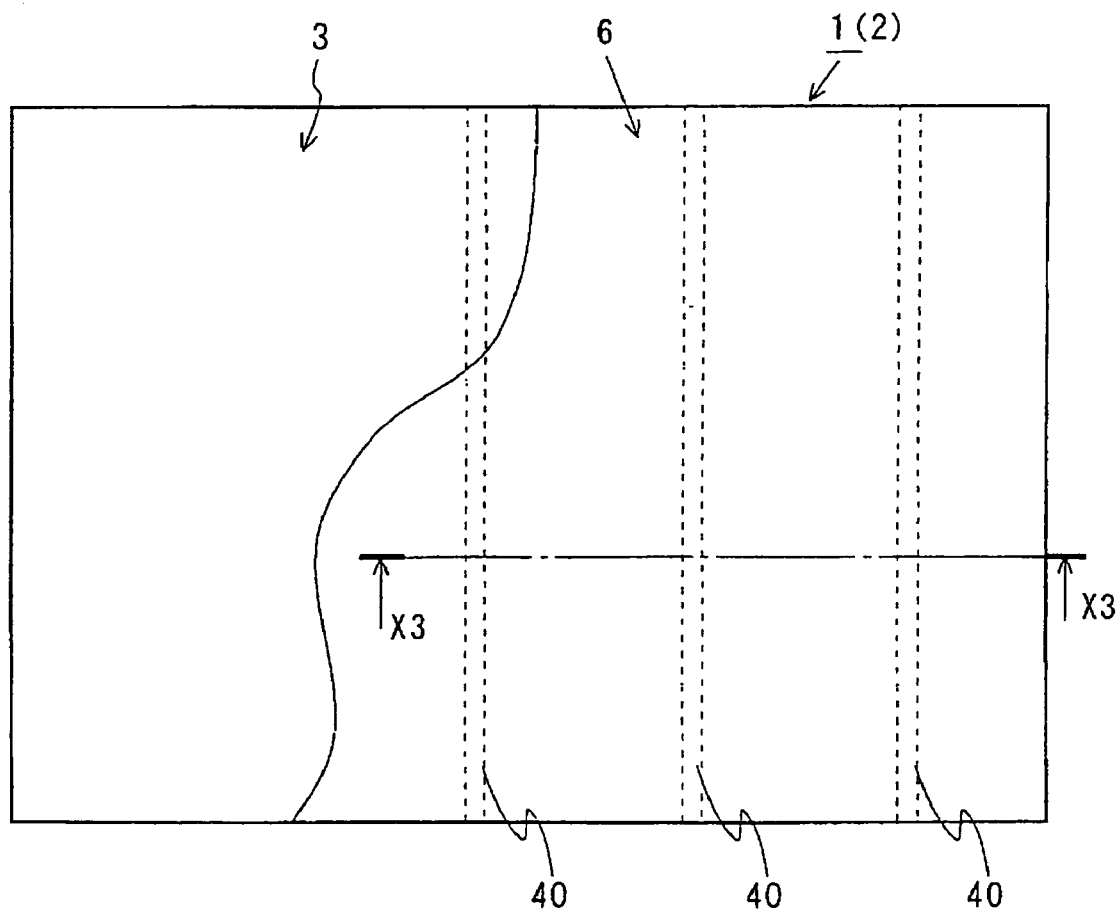
FIG. 12 is a plan view of a modification of surface light source device and display employing the same, a part of displaying member being cut off.
Figure 13:
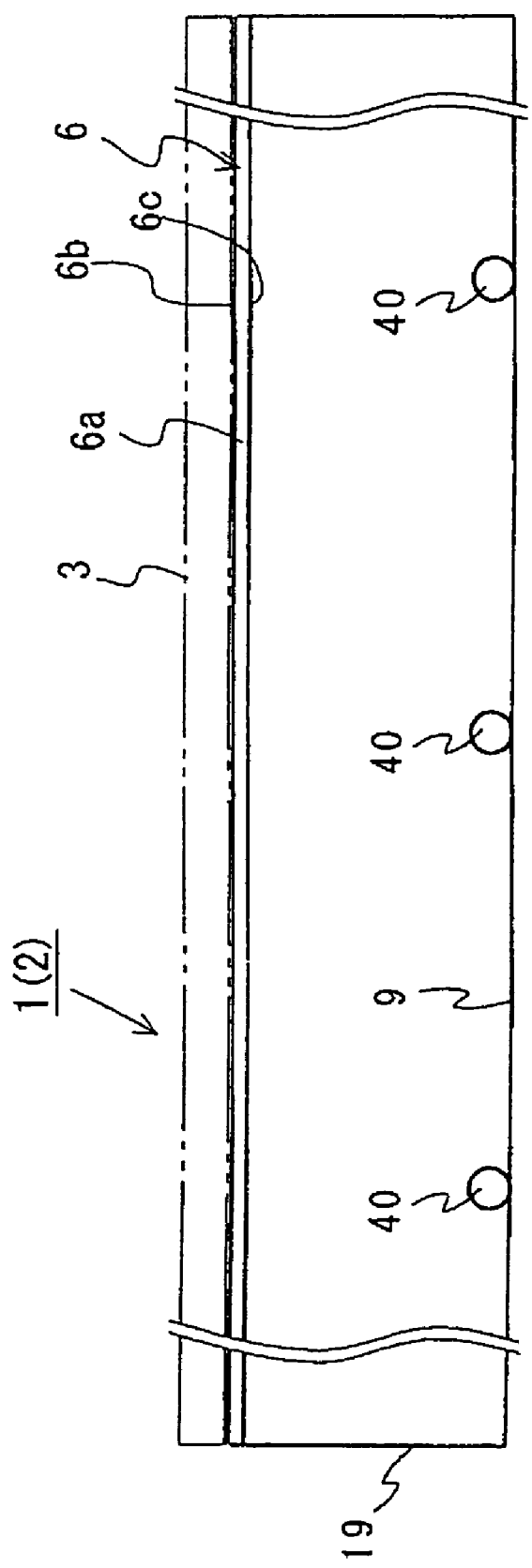
FIG. 13 is a cross section view along X3-X3 in FIG. 12.

For example, one or more fluorescent lamp(s) 40 may be employed as primary light source as shown in FIG. 12 or 13. Alternatively, a surface light source device may be employed as primary light source.

Second Embodiment (Outlined Structure of Surface Light Source Device and Display)

Figure 14:
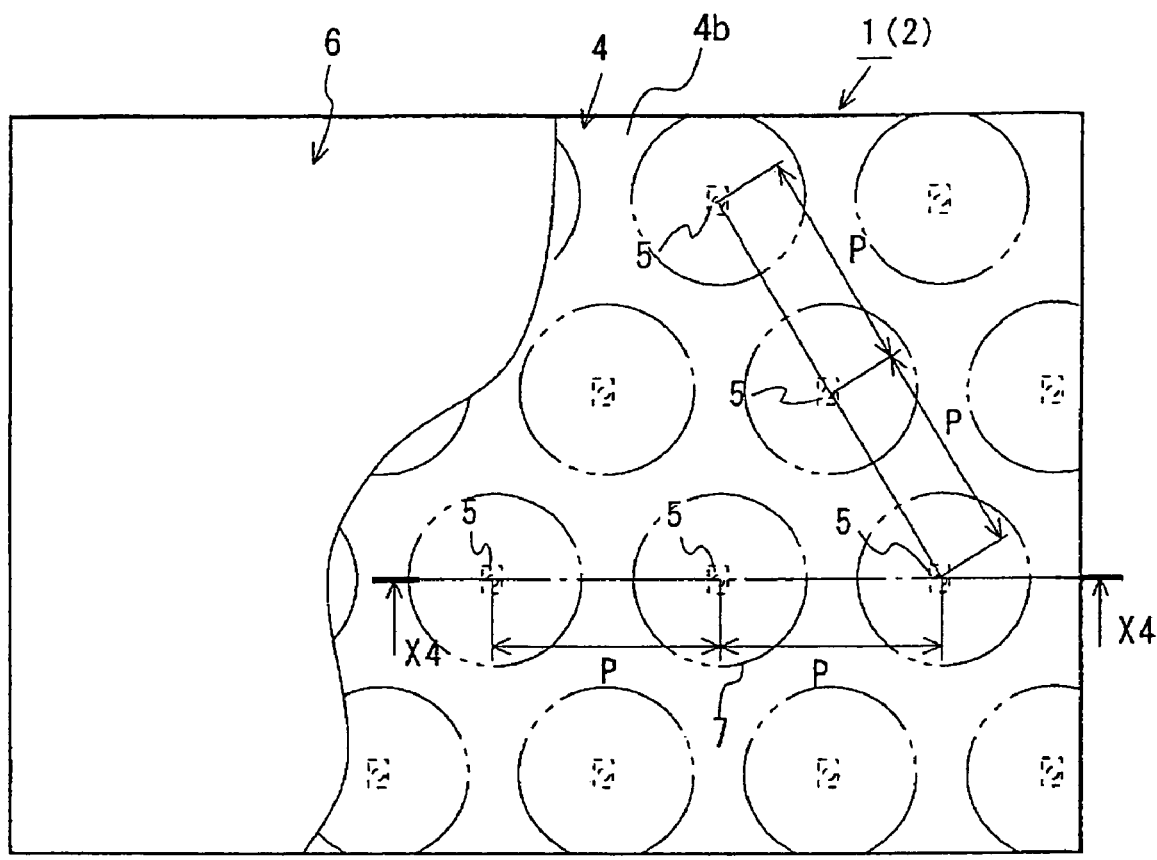
FIG. 14 is a plan view of a second embodiment of surface light source device and a display employing the same to which the present invention is applicable, a part of displaying member being cut off.
Figure 15:
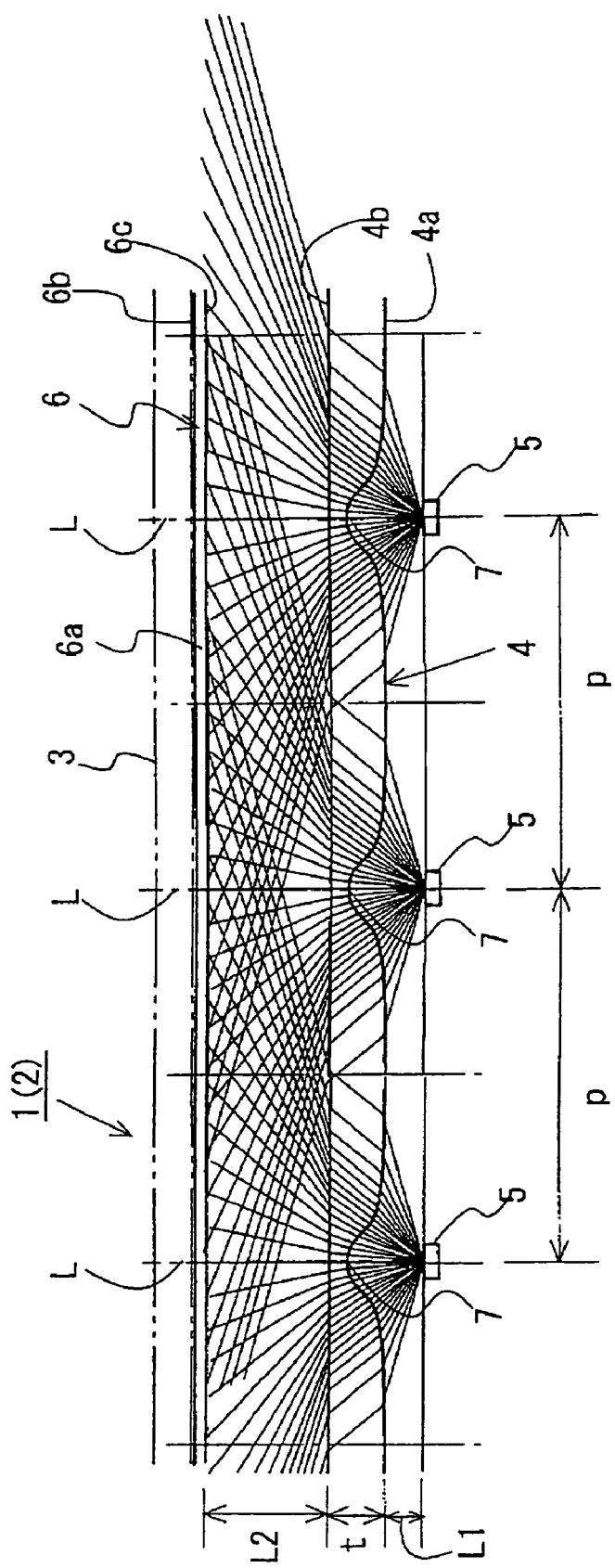
FIG. 15 is a cross section view along X4-X4 in FIG. 14.
Figure 16:
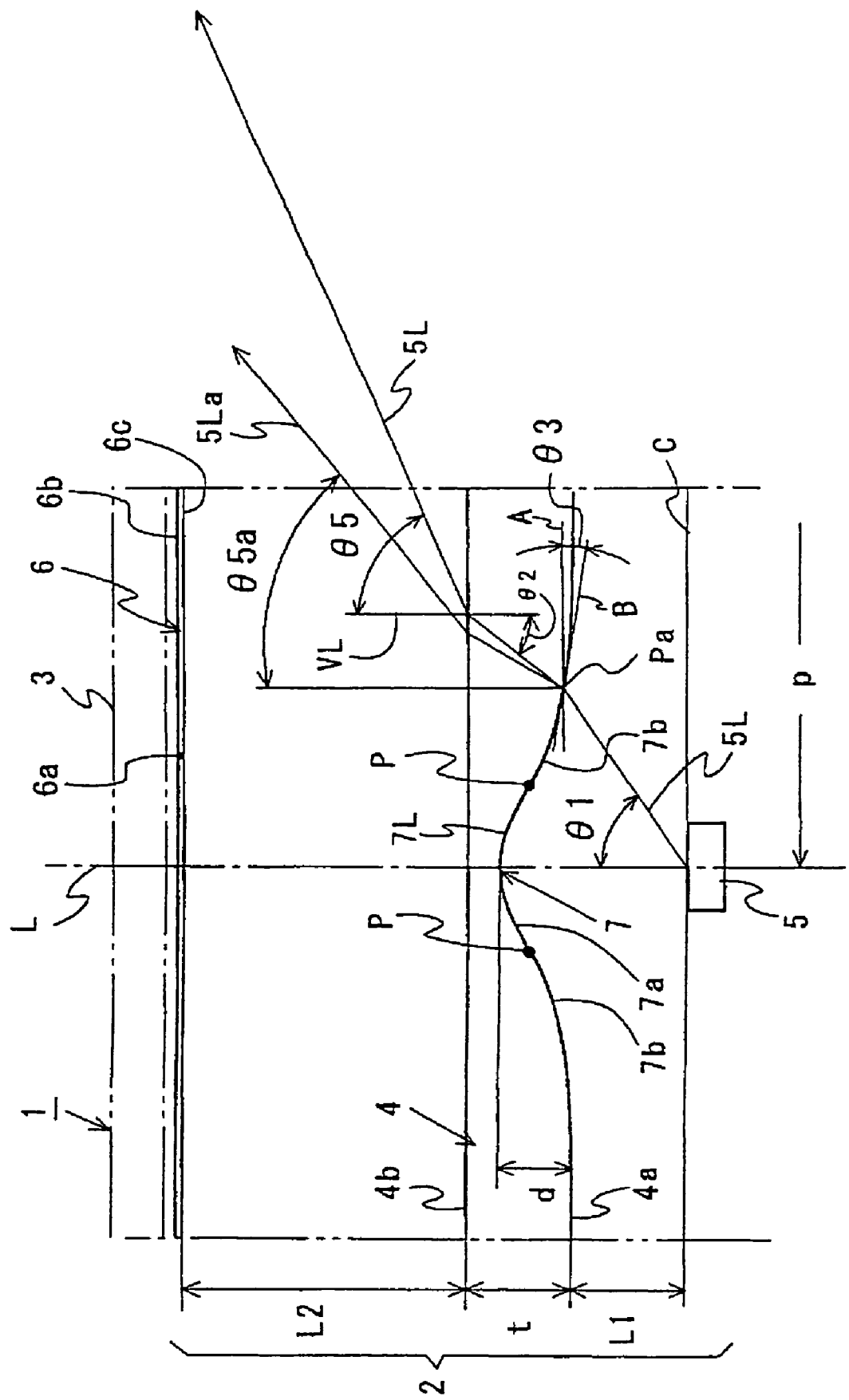
FIG. 16 is a partial cross section view of a display along an optical axis of LED, giving an partially enlarged illustration of FIG. 15 for illustrating details of recess configuration.

FIG. 14 is a plan view of a second embodiment of surface light source device and a display employing the same to which the present invention is applicable, a displaying member being removed and a part of displaying member being cut off. FIG. 15 is a cross section view along X4-X4 in FIG. 14. FIG. 16 is a partial cross section view of a display along an optical axis L of LED, giving an partially enlarged illustration of FIG. 15 for illustrating details of recess configuration.

It is noted that optical axis L is defined as a light traveling direction at a center of three-dimensional emission flux from LED 5 which is regarded as a point light source.

A feature of the second embodiment is that light flux control member 4 is interposed between a primary light source (LEDs 5) and light control member 6, thereby primary light being incident to light input face 6c of light control member 6 after transmitting through light flux control member 4.

Therefore description thereafter is generally focused on structure and function of the added light flux control member, detailed description of light control member 6 being omitted.

Display 1 comprises light flux control member 4 having a planar shape like a rectangle, LEDs 5 disposed at a generally constant interval behind back face (light incidence face) 4a of light flux control member 4, light control member 6 disposed along light flux control member 4 at a distance and displaying member 3.

Surface light source device 2 is composed by LEDs 5, light flux control member 4 and light control member 6. Light flux control member 4 is provided with at least one recess 7 on the light incidence face. Each recess 7 has a function of broadening angular propagation range of light flux.

(Light Flux Control Member)

Light flux control member 4 is a thin plate-like member made of transparent resin such as PMMA (polymethyl methacrylate), PC (polycarbonate), or transparent glass, having a shape such as shown in FIG. 14, 15 or 16.

Light flux control member 4 has a back face 4a on which recesses 7 are formed as to be opposite to LEDs 5, respectively. Recess 7 comprises first light entering surface 7a extending spherically around optical axis L of LED 5 as a center and second light entering surface 7b extending as to connect a periphery of first light entering face 7a to back face 4a smoothly.

First light entering surface 7a has a concave-like shape projecting away from LED 5, being configured symmetrically with respect to optical axis L of LED 5. Second light entering surface 7b has a curved configuration projecting generally in an inverse direction as compared with first light entering surface 7a. As a result, recess 7 has inflection P at a part connecting first light entering surface 7a to second light entering surface 7b. In connection with FIG. 16, symbols are defined as follows.

Reference plane C=Horizontal plane vertical to optical axis L of LED 5

Position Pa=Position at which light 5L from LED 5 is incident to light flux control member 4 (Position Pa is also a crossing point of profile line 7L of recess 7 and light in the cross section illustration of FIG. 16).

Line A=Line passing position Pa and parallel to reference plane C

Tangent B=Tangent of profile line 7L of recess 7 at position Pa

LED emitting angle θ1=Angle of any emission beam from LED 5 with respect to optical axis L Angle θ2=Angle of inner-incidence of light 5L travelling within light flux control member 4 to light emission face 4b (Angle of light 5L with respect to normal VL of light emission face 4b)

Lens inclination angle θ3=Angle made by tangent B and line A

Emission angle θ5=Emission angle of light 5L on being emitted from light emission face 4b of light flux control member 4 after entering into light flux control member 4 (Angle made by light 5L with respect to normal VL of light emission face 4b)

Recess 7 is formed as to allow a relation θ1 and θ5 to satisfy the following Conditions 1 and 2 for "light which is emitted toward within a certain angular range ("half-intensity-angular-range") covering from the maximum intensity direction (generally a direction of optical axis L) to "half-intensity-direction", except for light emitted toward within an angular-neighborhood of a normal line (optical axis L in FIG. 16).

It is noted that "half-intensity-direction" is a direction giving a half intensity of "the maximum emission intensity direction (generally a direction of optical axis L)".

Condition 1: (θ5/θ1)>1

Condition 2; Value of θ5/θ1 falls gradually according to increasing of θ1.

Figure 17:
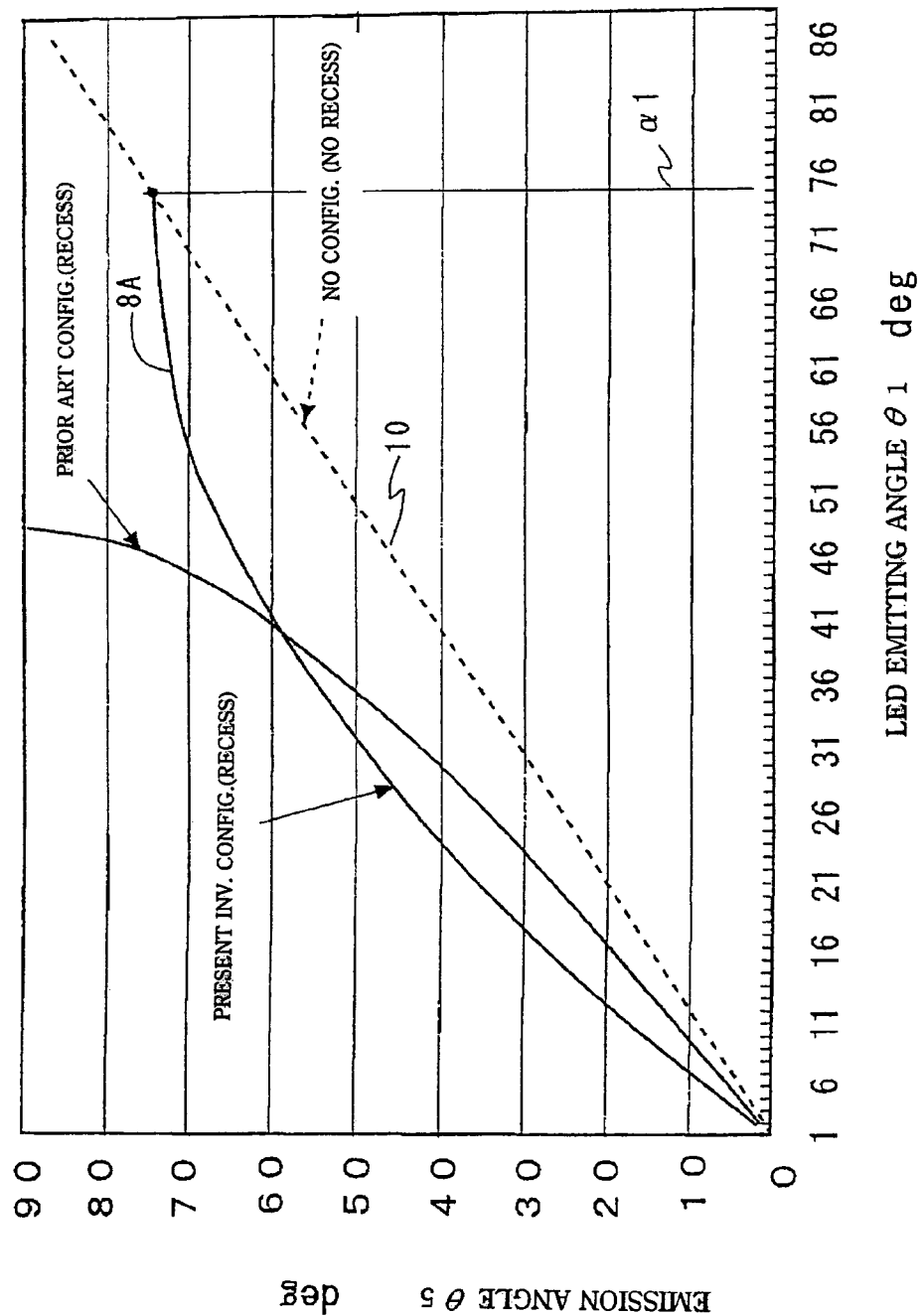
FIG. 17 is a diagram for illustrating a relation between LED emitting angle $\theta 1$ for light supply to a light flux control member and emission angle $\theta 5$.

FIG. 17 is a diagram for illustrating a relation between LED emitting angle θ1 (horizontal axis) as to light supply to a light flux control member 4 and emission angle θ5 (vertical axis).

Referring to FIG. 17, dotted line 10 shows a relation of (θ5/θ11)=1. Angular range of θ1<α1 is a range satisfying the above Conditions 1 and 2. However, it should be noted that "a range giving very small θ1" is excluded.

Now provided that refractive index of light flux control member 4 is n, θ2 and θ3 are expressed as below. It is noted that the above "range giving very small θ1" is preferably a rang roughly from −5° to +5°.

$$\theta 1 = \sin^{-1}(\sin\theta 5/n) \quad \text{(Formula 1)}$$

$$\theta 3 = \tan^{-1}\{(\sin\theta 1 - n \cdot \sin\theta 2)/(\cos\theta 1 - n \cdot \cos\theta 2)\} \quad \text{(Formula 2)}$$

Figure 18:
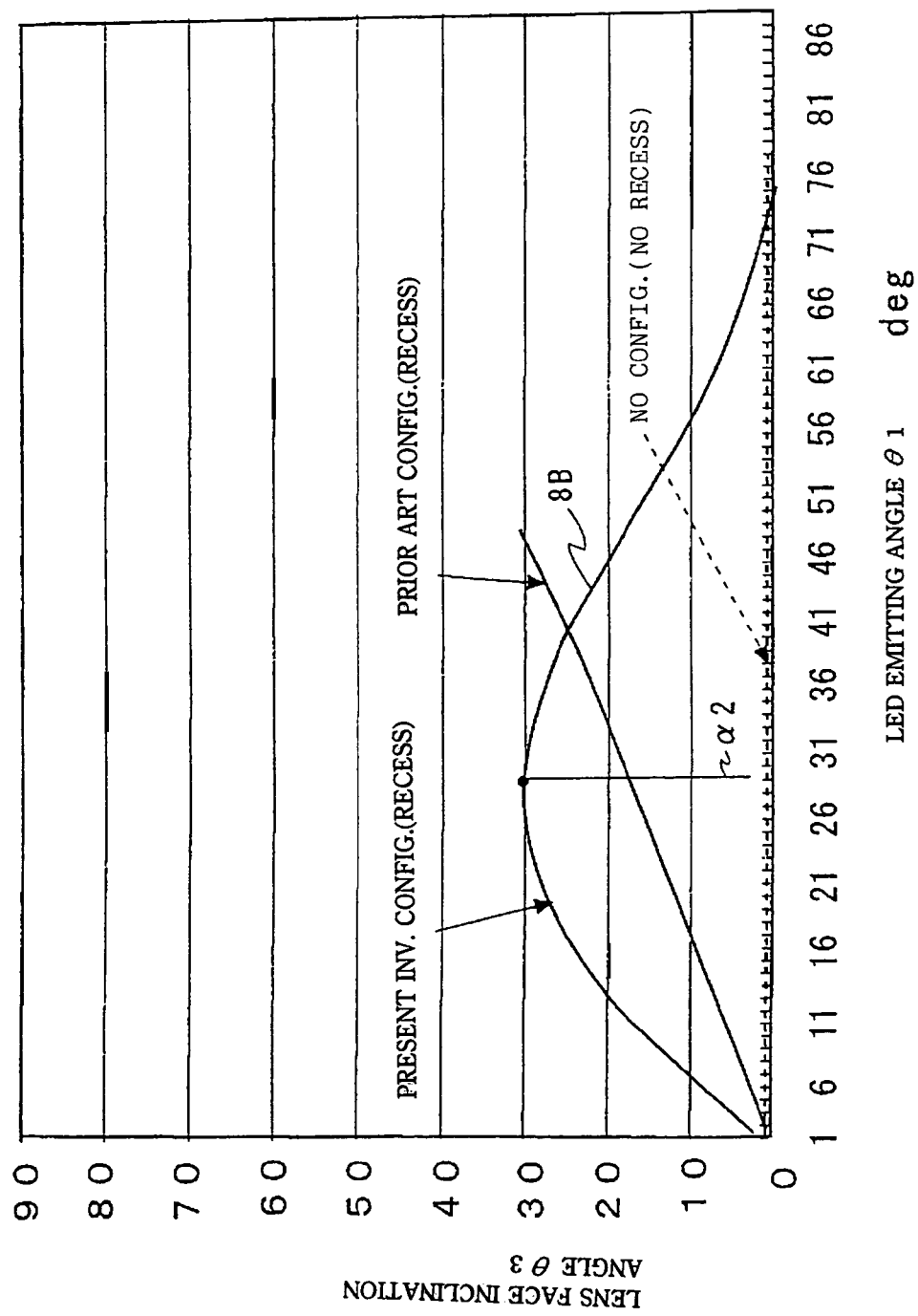
FIG. 18 is a diagram for illustrating a relation between LED emitting angle $\theta 1$ for a light flux control member and lens face inclination angle $\theta 3$.

FIG. 18 is a diagram for illustrating a relation between LED emitting angle θ1 and lens face inclination angle θ3.

According to the above relation between θ3 and θ1, θ3 increases gradually with increasing of θ1 until θ1=θ3=α2 is satisfied. As shown by line 8B in FIG. 18 and then falls gradually with increasing of θ1 within a range θ1>α2.

In the next place, operation of recess 7 of light flux control member 4 is described by referring to FIG. 16. Light 5L from LED 5 enters into light flux control member 4 through recess 7. On this, travelling directions of flux of light 5L is broadened (θ5a<θ5) as compared with imaginary cases in which back face 4a is flat face (without recess 7).

It is noted that θ5a is angle of light (of LED 5) emitted from light emission face 4b with respect to a normal of light emission face 4b under a condition such that back face 4a has no recess 7.

Therefore it is possible, for example, some of light which is emitted from LED 5 at emitting angle θ1 and travels toward half-intensity-direction reaches a vicinage of a location at which light control member 6 and optical axis L of LED 5 just beyond LED 5 adjacent to the above LED 5 as shown in FIG. 15.

Concrete configuration of recess 7 are preferably designed depending on various factors such as the followings.

(i) Emission characteristics of LED 5, especially, angular extension. Angular extension can be represented by half-intensity-angular-range.

(ii) Distance L1 between LED 5 and light flux control member 4

(iii) Pitch between LEDs 5

(iv) Thickness t of light flux control member 4

(v) Distance L2 between light emission face 4b of light flux control member 4 and light control member 6

Parameters expressing configuration of recess 7 concretely include "the maximum diameter (diameter of the outermost periphery of second light entering surface 7b)" and "depth d". Configurations of first and second light entering surfaces 7a and 7b are also preferably designed under consideration of factors as above.

Figure 19:
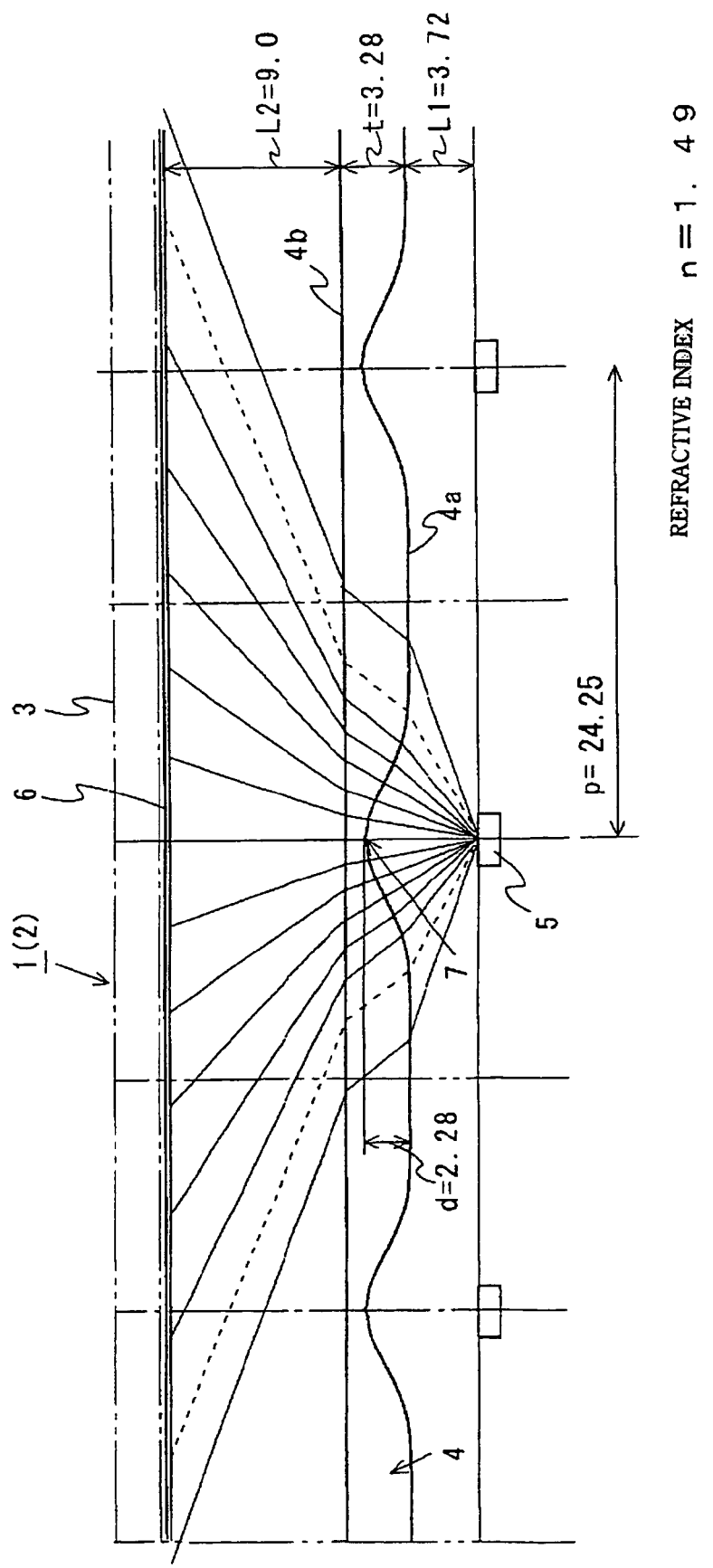
FIG. 19 is a cross section view of a display for illustrating an example of light flux control member.
Figure 20:
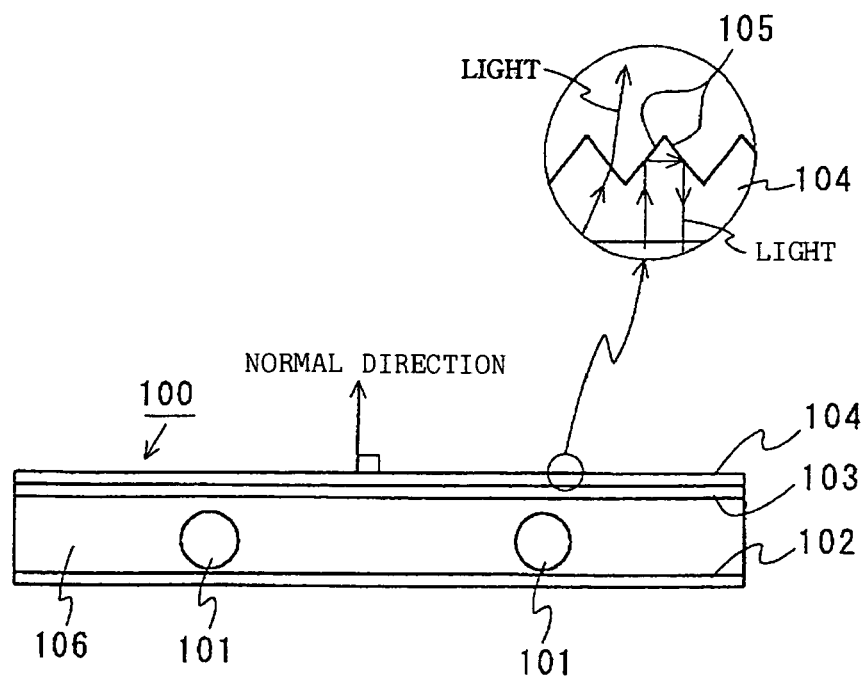
FIG. 20 is a side view of a surface light source device in accordance with a first prior art.
Figure 21:
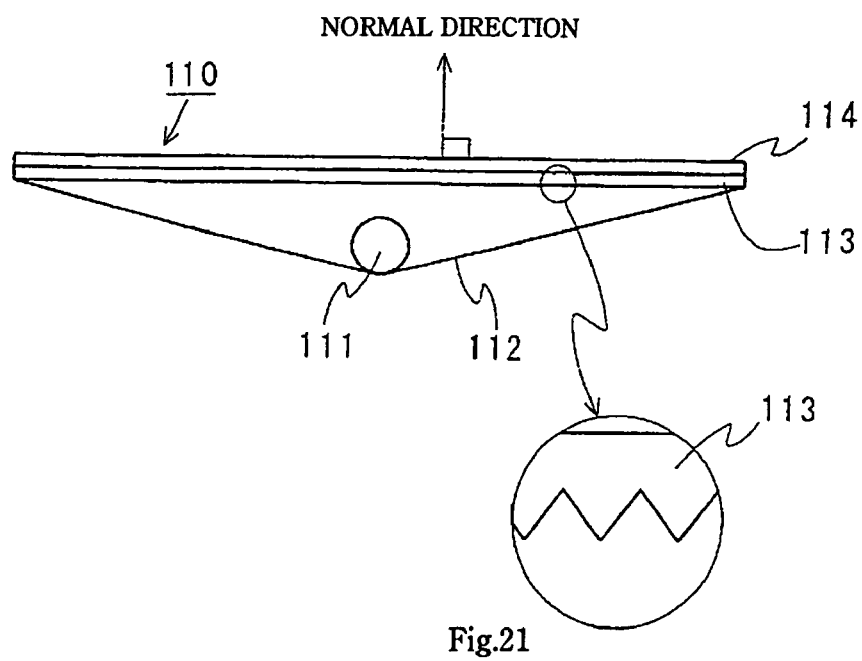
FIG. 21 is a side view of a surface light source device in accordance with a first prior art.

Examples of values of parameters of light flux control member 4 are shown in FIG. 19.

Refractive index n=1.49
L1=3.72 mm
p=24.25 mm
t=3.28 mm
L2=9.0 mm
d=2.28 mm

It is noted that a periphery portion of second light entering surface 7b is connected smoothly to generally flat back face 4a at a position to which light of θ1 generally equal to 75° is incident (See curve 8B shown in FIG. 18).

First light entering surface 7a corresponds to an angular range (giving θ1 smaller than about 30°) along a curve-like part causing θ3 to be increased with increasing of θ1, as shown by curve 8B shown in FIG. 18).

Further, second light entering surface 7b corresponds to an angular range of curve-like part (giving θ1 from about 30° to about 75°) causing θ3 to be decreased with increasing of θ1, as shown by curve 8B shown in FIG. 18.

Inflection connecting first light entering surface 7a to second light entering surface 7b is an apex point of "curve-like part" at which curve 8B shown in FIG. 18 changes from increasing to decreasing ($\theta 1$=about 30°). It is noted that recess 7 in this embodiment is formed so that a position at which $\theta 1$=about 30° is also a position at which $\theta 3$=about 30°.

The above "curve-like part" includes not only configurations drawing overall smoothly curved lines, of course, but also continuously connected straight lines looking like a curve as a whole. Configurations approximated ny smooth curves, even if straight parts are included therein, are not excluded.

Attention should be paid to a fact that recess 7 configured as above emission angle $\theta 5$ of light emitted from light emission face 4b rises smoothly from 0° to about 75° like curve 8A which is convex upward as shown in FIG. 17.

At $\theta 5$=about 75°, curve-like line 8A accords with curve 10 which shows a relation between $\theta 1$ of light emitted from LED 5 and emission angle $\theta 5$ of light emitted from light emission face 4b in a case where no recess 7 is formed (like flat-plate).

Curve 8A expressing $\theta 5$ in a case where light flux control member 4 is provided with recesses 7 may include a straight line part locally, but will look like a curve as a whole.

As described above, according to surface light source device 2 of this embodiment light from LED 5 can be transferred to light control member 6 after being broadened by light flux control member 4. Light light control member 6 receives effectively by utilizing functions of projections 8 formed on light input face 6c, then causing light to be emitted from light outputting face 6b.

If projections 10 are formed on light output face 6b, light output deflected to around a frontal direction is obtained.

Through such processes, light of LED 5s is made inconspicuous on a light output face of light control member 6. In particular, light flux control member 4 makes output light more uniform as compared with the first embodiment.

It is needless to say that light output face 6b may be provided with projections 20 or prismatic projections 30 as described previously, or may be made flat or roughened.

The above embodiments "tapered column-like portion" of projection 8 is conical, putting no limitation on the present invention. For example, tapered column-like portion may be shaped like polygon-pyramid.

What is claimed is:

1. A surface light source device comprising:
a light control member comprising a light input face and a light output face opposite with said light input face;
a primary light source to supply a primary light toward said light input face;
a light flux control member interposed between said primary light source and said light control member, where said primary light is incident to said light input face after transmitting through said light flux control member, and
wherein said light input face is provided with a plurality of projections for light input promotion of the incident primary light, each of which is composed of a substantially domed spherical top portion connected to a tapered column-like portion.

2. The surface light source device in accordance with claim 1, wherein each of said projections has a height greater than a distance as far as an adjacent projection.

3. The surface light source device in accordance with claim 1 or 2, wherein said light output face is formed of a roughened surface.

4. The surface light source device in accordance with claim 1 or 2, wherein said light output face is provided with a plurality of projections for light output direction control.

5. A surface light source device comprising:
a light control member provided with a light input face and a light output face opposite with the light input face,
wherein said light input face is provided with a plurality of projection, each having a height h1 and a width d1 for light input promotion, and each of said plurality of projection is composed of a substantially domed spherical top portion connected to a tapered column-like portion;
a primary direct light source to supply light including primary direct light toward the light input face; and
a light flux control member interposed between said primary direct light source and said light control member, where said primary direct light being incident to said light input face after transmitting through said light flux control member.

6. A surface light source device comprising:
a light control member provided with a light input face and a light output face opposite with the light input face,
wherein said light input face is provided with a plurality of projection, each having a height h1 and a width d1 for light input promotion, and each of said plurality of projection is composed of a substantially domed spherical top portion connected to a tapered column-like portion;
a primary direct light source to supply light including primary direct light toward the light input face; and
a light flux control member interposed between said primary direct light source and said light control member, where said primary direct light being incident to said light input face after transmitting through said light flux control member.
wherein said light output face is formed of a roughened surface.

7. A surface light source device comprising:
a light control member provided with a light input face and a light output face opposite with the light input face,
wherein said light input face is provided with a plurality of projection, each having a height h1 and a width d1 for light input promotion, and each of said plurality of projection is composed of a substantially domed spherical top portion connected to a tapered column-like portion;
a primary direct light source supply light including primary direct light toward the light input face; and
a light flux control member interposed between said primary direct light source and said light control member, where said primary direct light being incident to said light input face after transmitting through said light flux control member.
wherein said light output face is provided with another plurality of projection for light output direction control.

8. A display comprising:
the surface light source device in accordance with claim 5; and
a displaying member supplied with light from the surface light source device.

9. A display comprising:
the surface light source device in accordance with claim 6; and
a displaying member supplied with light from the surface light source device.

10. A display comprising:
the surface light source device in accordance with claim 7; and
a displaying member supplied with light from the surface light source device.

11. A display comprising:
the surface light source device in accordance with claim 6; and a displaying member supplied with light from the surface light source device., 12. A display comprising:

the surface light source device in accordance with claim 6; and a displaying member supplied with light from the surface light source device.

13. A light source device comprising:

a light control member comprising a light input face and an opposing light output face, wherein said light input face is provided with a plurality of projections having a height h1 and a width d1 to direct light from a direct light source towards said light output face, and said plurality of projections are formed to have a substantially dome shaped top portion attached to a tapered lower portion, and wherein h1 is greater than d1;

a display member above said light output face, wherein the display member is disposed directly above a primary direst light source to supply a primary light toward the light input surface; and a light flux control member interposed between said primary light source and said light control member, where said primary light being incident to said light input face after transmitting through said light flux control member.

14. A display comprising:

the surface light source device in accordance with claim 13; and a displaying member supplied with light from the surface light source device.

15. The light source device of claim 13, wherein said plurality of projections comprise a light permeable resin selected from the group consisting of polymethyl methacrylate (PMMA) and polycarbonate (PC).

16. The light source device of claim 13, wherein said light permeable resin is PMMA.

17. The light source device of claim 13, wherein said light output face comprises another plurality of projections having a height h2 and a width d2, and wherein h2 is less than d2.

18. The light source device of claim 13 further comprising a reflection member of a resin sheet with applied silver vapour.

19. The light source device of claim 18, wherein the reflection member is disposed behind said primary light source to reflect light directly toward said light input face and wherein said reflection member is composed of polyethylene terephthalate (PET).

20. The light source device of claim 13, wherein the light output face is a roughened surface.

21. The light source device of claim 17, wherein each of said another plurality of projections comprises a spherically domed top portion attached to a tapered portion of a height h2 and a width d2 to transmit light received via the light input face toward the display member.

* * * * *

UNITED STATES PATENT AND TRADEMARK OFFICE
CERTIFICATE OF CORRECTION

PATENT NO. : 7,431,492 B2
APPLICATION NO. : 11/360387
DATED : October 7, 2008
INVENTOR(S) : Shingo Ohkawa It is certified that error appears in the above-identified patent and that said Letters Patent is hereby corrected as shown below:

Column 12, Line 5, change "projection," to --projections,--.

Column 12, Lines 6-7, change "projection" to --projections--.

Column 12, Line 20, change "projection," to --projections,--.

Column 12, Lines 21-22, change "projection" to --projections--.

Column 12, Line 30, change "member." to --member,--.

Column 12, Line 37, change "projection," to --projections,--.

Column 12, Lines 38-39, change "projection" to --projections--.

Column 12, Line 41, change "source" to --source to--.

Column 12, Line 47, change "member." to --member,--.

Column 12, Line 49, change "projection" to --projections--.

Column 12, Line 66, change "6;" to --5;--.

Column 13, Line 2, change "device.," to --device.--.

Column 13, Line 13, change "face," to --face--.

Column 13, Line 16, after "and" delete "wherein".

Column 13, Line 19, before "light" delete "direst".

Signed and Sealed this

Twenty-third Day of December, 2008

JON W. DUDAS
*Director of the United States Patent and Trademark Office*